March 14, 1944.  L. D. PLOTNER  2,344,454
TRAINING DEVICE
Filed Dec. 7, 1942  2 Sheets-Sheet 1
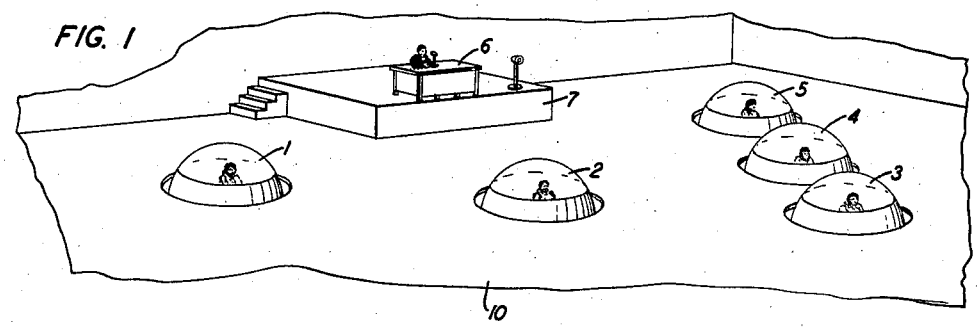
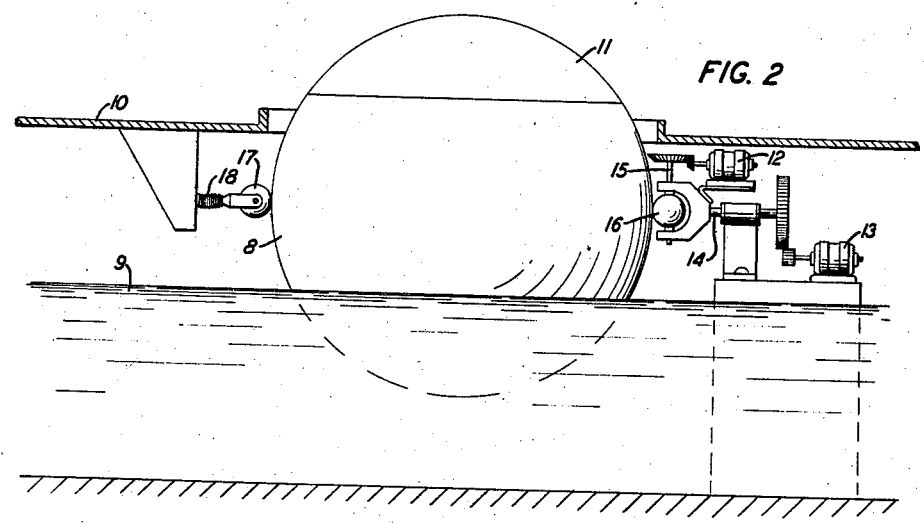
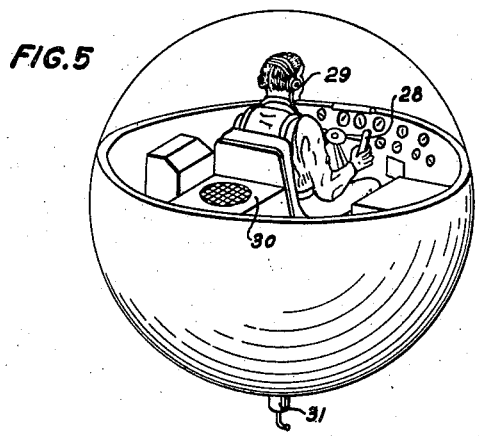
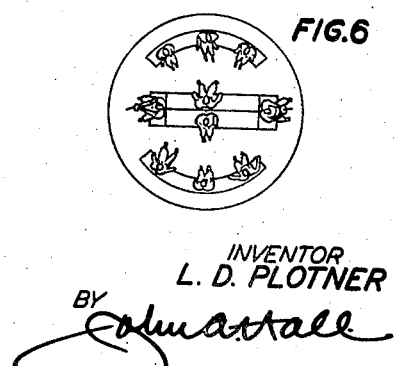
INVENTOR
L. D. PLOTNER
BY
ATTORNEY March 14, 1944.　　　L. D. PLOTNER　　　2,344,454
TRAINING DEVICE
Filed Dec. 7, 1942　　　2 Sheets-Sheet 2
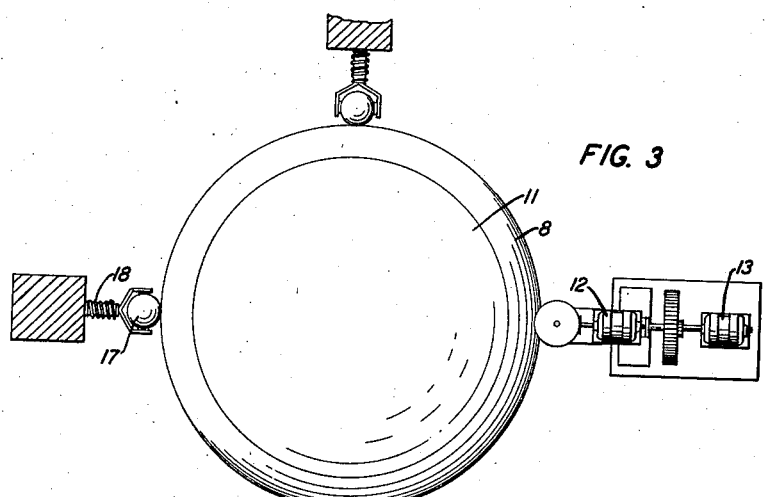
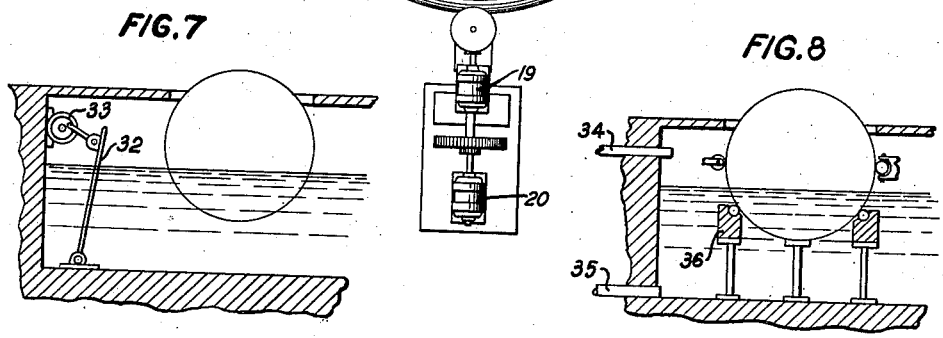
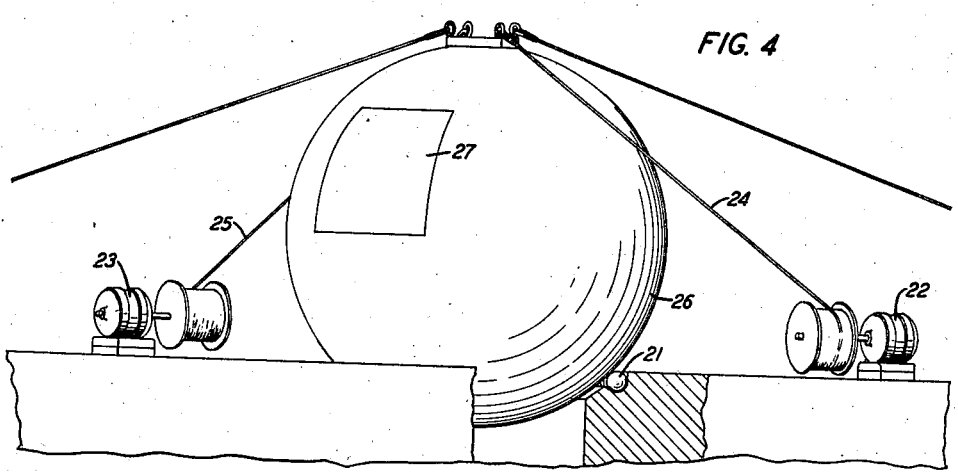
INVENTOR
L. D. PLOTNER
BY
ATTORNEY Patented Mar. 14, 1944

2,344,454

UNITED STATES PATENT OFFICE 2,344,454

TRAINING DEVICE

Loyd D. Plotner, Maplewood, N. J., assignor to Bell Telephone Laboratories, Incorporated, New York, N. Y., a corporation of New York Application December 7, 1942, Serial No. 468,085

15 Claims. (Cl. 35—12)

This invention relates to training apparatus and particularly to apparatus for the instruction of students in aviation, the object being to produce an economical construction which may be produced expeditiously and in quantity where time and material are limited.

Heretofore pilot training machines have been elaborate, intricate and of costly construction. Generally they have been of gimbal construction requiring sturdy bearings necessitating frequent lubrication and considerable maintenance. The present invention in comparison is simple, sturdy and rugged and requires little if any attention for maintenance. Fundamentally, it comprises a seat within a floating sphere which may be moved in any direction about its center point to simulate movements to be expected in an airplane.

In accordance with one embodiment of the invention the spherical shell forming the body of the training device floats on a body of water and by appropriate controls may be rotated in any simple or compound movement about its center point.

In accordance with another embodiment of the invention the spherical shell is supported on a ring less in diameter than the greatest diameter of the shell and which ring is provided with a race of ball bearings whereby the movement of the said shell in any direction about its center point is free and unimpeded.

A feature of the invention is a floating sphere in combination with appropriate controls whereby the sphere may be rotated about its center point in any direction.

Another feature of the invention is a floating sphere in combination with means bearing on the surface thereof for moving said shell in any direction about its center point.

The drawings consist of two sheets having eight figures, as follows:

Fig. 1 is a perspective drawing showing one general arrangement of a plurality of training devices under control of an instructor;

Fig. 2 is a side view, partly in section, showing how the floating sphere may be supported and moved in any direction about its center point;

Fig. 3 is a top view of the same;

Fig. 4 is a perspective view, partly in section, showing an alternative supporting and controlling arrangement;

Fig. 5 is a perspective view of a training compartment with approximately the upper half rendered transparent so that the position of the trainee and the disposition of the apparatus within may be seen;

Fig. 6 is a horizontal sectional view showing how a large sized sphere may be used to hold a group of trainees;

Fig. 7 is a view similar to that of Fig. 2 showing in schematic form a means for disturbing the level of the water on which the sphere floats to produce in the trainee sensations simulating those encountered in service; and Fig. 8 is another view similar to that of Fig. 2 showing means to change the water level and a construction combining those shown in Figs. 2 and 4.

The training device of the present invention is one which may be used to simultaneously train a number of airplane pilots. A plurality of such devices may be placed in any given formation in an appropriate room under control of a single instructor. In Fig. 1, five devices 1 to 5, inclusive, are shown as placed in the familiar V formation. An instructor sits at a control desk 6 on a dais 7, from which he may control various sound effects and the various movements of the trainers. The walls and other parts of the room may be appropriately decorated to produce any desired illusion.

As the instructor operates controls to cause any given movement of the training devices, each student will operate controls within his sphere to counteract such movement or to produce any movement desired by the instructor. The means whereby the training device is held under the dual control of the instructor and the student is well known and will not be explained in detail here, since the novelty of the present arrangement resides in the general construction and method of support rather than in the details of the control.

As shown in Fig. 2, the training device consists essentially of a floating sphere 8 supported on a body of liquid 9 and held generally in one position by the edge of the circular aperture in the sheet 10 which may serve as the floor of the room of Fig. 1. The sphere 8 is of any metal or plastic water-tight construction and is in the form of a shell having appropriate seating arrangements inside and is of such size to conveniently accommodate a student. It may have a top portion 11 formed of transparent plastic material which may be clamped on in any convenient manner after the student has taken his place within the device.

The level of the liquid 9 may be raised or lowered so that the student will have a proper perspective view and the moving controls will properly engage the outside surface of the sphere. Means may be provided to quickly and slightly raise and lower the level of the liquid to produce certain sensations encountered in flying.

The movement of the sphere may be controlled by a pair of motors 12 and 13. In the position shown in Fig. 2 the operation of motor 12 alone will cause rotation of the sphere about a vertical axis. To cause other directional movements the motor 13 may first be operated to rotate the axis of the shaft 14 or both motors 12 and 13 may be simultaneously operated to cause a compound movement. The operation of motor 12 rotates the shaft 15 to cause a corresponding movement of a ball of resilient material 16 such as rubber, which is in frictional engagement with the outer surface of the sphere 8. A similar ball 17 held against the surface at a diametrically opposed point and pressed against the surface by a spring 18 serves as a guide and to maintain a proper frictional engagement between the sphere 8 and the said balls.

The motors 12 and 13 may be under the dual control of the instructor and the student or they may be under the control of the instructor alone, while another set 19 and 20 is under control of the student.

It will be understood that the whole device may be mounted on a fast moving elevator whereby the sensation of falling or fast climbing may be produced.

In Fig. 4 an alternative arrangement is shown in which the sphere is supported on a circular race of balls such as 21. In this case the movement may be produced by conveniently arranged motors 22 and 23 acting to control cables 24 and 25, respectively. Such cables and others may be attached in any convenient manner to a point atop the sphere 26. The student may enter the sphere through any conveniently spaced port 27.

With such an arrangement, which may be produced at comparatively low cost, a number of students may be placed under instruction simultaneously. It should be noted that a device of this nature may be made in various sizes—small to simulate the small single seat fighter planes, and large, with space enough to accommodate a full crew to simulate the largest type bombers.

As shown in Fig. 5 the aviation trainee may be seated in such a manner that he may grasp the control 28 which is the modern equivalent of the "joy stick" and which he may manipulate in the same manner he will have to move such control later in actual service. This control will operate electrical devices in the manner shown, by way of example, in Patent 1,393,456 granted to Ruggles October 11, 1921. Also, as indicated in Fig. 5 the trainee may be supplied with the usual communication apparatus, indicated by the head phones 29. For sound effects other than communication a loudspeaker 30 may be installed within the compartment.

The electrical connections for these various pieces of electrical apparatus may be made through a cable 31 which may be brought out of the compartment at any convenient place. As illustrated herein such a cable, properly waterproofed, may be brought out at the bottom of the compartment and will be long enough and flexible enough to allow for all movements of the compartment.

Another method may be stated to be in wireless control. No details of this are shown since it is clearly understood that there are a number of telemetric methods whereby apparatus may be remotely controlled over radio communication channels.

Fig. 6 is a plan view of the seating arrangement within a large sized training compartment. In such a device an aviator and his whole crew may be trained and will simultaneously experience the same sensations of movement disturbance of equilibrium and sound effects.

Fig. 7 is a fragmentary sectional view showing how a paddle 32 may be moved by a motor 33 to cause sufficient disturbance of the water level to give the aviation trainee a "bumpy ride" and produce the sensations encountered by aviators in service.

Fig. 8 is a fragmentary sectional view showing pipes 34 and 35 for changing the level of the water on which the compartment floats. This figure also shows a ring 36 holding a race of ball bearings similar to that of Fig. 4 so that the compartment may not sink lower than a predetermined level. It will be understood that many variations of these suggested arrangements may be made, these being shown by way of illustration and not as limitations.

What is claimed is:

1. In a device of the class described, a movable compartment for holding a trainee comprising a spherical shell supported by floating on a body of liquid, a restraining ring less in diameter than the greatest diameter of said spherical shell for holding the center point of said shell stationary and means acting on the surface thereof to move said shell in any direction about its center point.

2. In a device of the class described, a movable compartment for holding a trainee comprising a spherical shell, a ring less in diameter than the greatest diameter of said spherical shell, a race of ball bearings held in the inner surface of said ring, said spherical shell resting on said ball bearing race and means acting on the surface of said spherical shell for moving said shell in any direction about the center point thereof.

3. In a device of the class described, a movable compartment for holding a trainee comprising a spherical shell, means for supporting said shell with its center point held stationary and means for moving said shell in any direction about its said center point.

4. In a device of the class described, a movable compartment for holding a trainee comprising a spherical shell supported with its center point in a stationary position, a manhole to allow entrance and exit of the trainee, a cover for said manhole conforming in contour to the spherical shape of said shell, said manhole cover being constructed of transparent plastic material, and means bearing on the external surface of said shell for moving said shell in any direction about its center point.

5. A device for supporting a movable compartment on fluid and adapted to hold an aviation trainee comprising a shell having an exterior spherical form, means for confining said shell to a single location and means to move universally said shell in various directions to simulate movements and produce sensations encountered by an aviator.

6. A device for supporting a movable compartment adapted to hold an aviation trainee comprising a shell having an exterior spherical form, means bearing on the surface thereof for confining said shell to a single location and means bearing on the surface thereof to move said shell in various directions to simulate movements and produce sensations encountered by an aviator.

7. A device for supporting a movable compartment adapted to hold an aviation trainee comprising a shell having an exterior spherical form, a body of water for holding the said sphere at a given level, means for confining said shell to substantially a single location and means external thereto for moving said shell in various directions to simulate movements and produce sensations encountered by an aviator.

8. A device for supporting a movable compartment adapted to hold an aviation trainee comprising a shell having an exterior spherical form, means for holding the center point of said shell at a fixed point with regard to a horizontal plane passing through said center point, and means bearing on the surface of said shell to move said shell in various directions to simulate movements and produce sensations encountered by an aviator.

9. A device for supporting a movable compartment adapted to hold an aviation trainee comprising a shell having an exterior spherical form, a portion of said shell being removable for the entrance or exit of a trainee, said removable portion being constructed of transparent material affording the trainee vision of exterior simulated scenes whereby upon movement of said shell the trainee will have reference points for orienting his position, means for confining said shell to a single location, and means for moving said shell in various directions to simulate movements and produce sensations encountered by an aviator.

10. A device for supporting a movable compartment adapted to hold an aviation trainee comprising a spherical shell, means for freely supporting said shell in a single location by pressure on the surface thereof and means for stimulating the senses of a trainee including means for imparting simulated movements of an airplane to said shell.

11. A device for supporting a movable compartment adapted to hold an aviation trainee comprising a shell having an exterior spherical form, a body of water for floatingly supporting said shell, a platform mounted at some distance above the surface of said water and parallel thereto having a circular opening therein through which the upper portion of said shell protrudes, said circular opening acting as a stationary ring of a diameter less in dimensions that the greatest diameter of said shell to retain said shell substantially in a single location and means to universally move said shell to simulate movements and produce sensations encountered by an aviator.

12. A device for supporting a movable compartment adapted to hold an aviation trainee comprising a shell having an exterior spherical form, a body of water for floatingly supporting said shell, a platform mounted at some distance above the surface of said water and parallel thereto having a circular opening therein through which the upper portion of said shell protrudes, said circular opening acting as a stationary ring of a diameter less in dimensions than the greatest diameter of said shell to retain said shell substantially in a single location, the upper portion of said shell being removable to provide entrance and egress from said shell and said removable upper portion of said shell being formed of transparent material whereby said trainee will have within his line of vision all surrounding walls and objects above said platform, and means acting on the exterior surface of said shell to impart movements thereto simulating movements and producing sensations encountered by an aviator.

13. A device for supporting a movable compartment adapted to hold one or more of aviation trainees comprising a shell having an exterior spherical form, means bearing on the surface thereof for confining said shell to a single location and means bearing on the surface thereof to move said shell in various directions to simulate movements and produce sensations encountered by an aviator and his crew.

14. A device for supporting a movable compartment adapted to hold a group of aviation trainees comprising a shell having an exterior spherical form, means bearing on the surface thereof for confining said shell to a single location and means bearing on the surface thereof to move said shell in various directions to simulate movements and produce sensations encountered by an aviator and his crew.

15. A device for supporting a plurality of movable compartments each adapted to hold an aviation trainee, each said compartment comprising a shell having an exterior spherical form, means for confining said shells each to a single location in any desired geometrical formation simulating a standard mass flight formation, and means to move said shells in various directions to simulate movements and produce sensations encountered by aviators.

LOYD D. PLOTNER.